(12) United States Patent
Tan et al.

(10) Patent No.: US 10,930,932 B2
(45) Date of Patent: Feb. 23, 2021

(54) POSITIVE ELECTRODE PLATE AND BATTERY

(71) Applicant: CONTEMPORARY AMPEREX TECHNOLOGY CO., LIMITED, Ningde (CN)

(72) Inventors: Yanyun Tan, Ningde (CN); Fuping Luo, Ningde (CN); Shengwei Wang, Ningde (CN); Xinxin Du, Ningde (CN); Qiaoge Wang, Ningde (CN)

(73) Assignee: CONTEMPORARY AMPEREX TECHNOLOGY CO., LIMITED, Fujian Province (CN)

( * ) Notice: Subject to any disclaimer, the term of this patent is extended or adjusted under 35 U.S.C. 154(b) by 66 days.

(21) Appl. No.: 16/268,326

(22) Filed: Feb. 5, 2019

(65) Prior Publication Data
US 2020/0006765 A1 Jan. 2, 2020

(30) Foreign Application Priority Data
Jun. 29, 2018 (CN) .......................... 2018 1 0696957

(51) Int. Cl.
H01M 4/525 (2010.01)
H01M 4/505 (2010.01)
H01M 4/02 (2006.01)

(52) U.S. Cl.
CPC ........... H01M 4/525 (2013.01); H01M 4/505 (2013.01); H01M 2004/028 (2013.01)

(58) Field of Classification Search
CPC ................. H01M 4/525; H01M 4/505; H01M 2004/028; H01M 10/0525; H01M 2004/021; H01M 4/131; H01M 4/485; H01M 4/667
See application file for complete search history.

(56) References Cited

U.S. PATENT DOCUMENTS

| 2010/0159325 | A1 | 6/2010 | Sugiura et al. | |
| 2016/0028073 | A1 | 1/2016 | Ohara et al. | |
| 2017/0271653 | A1* | 9/2017 | Yamauchi | H01M 4/505 |
| 2018/0191027 | A1* | 7/2018 | Ohara | H01M 10/0525 |
| 2019/0363348 | A1* | 11/2019 | Kurita | H01M 4/386 |
| 2020/0185719 | A1* | 6/2020 | Piao | H01M 4/133 |

FOREIGN PATENT DOCUMENTS

| CN | 1418174 | A | 5/2003 |
| CN | 102148364 | A | 8/2011 |
| CN | 104584268 | A | 4/2015 |
| CN | 107403905 | A | 11/2017 |
| EP | 3322023 | A1 | 5/2018 |
| JP | 2014053155 | A | 3/2014 |

OTHER PUBLICATIONS

Contemporary Amperex Technology Co., Limited, Second Office action, CN201810696957.2, Feb. 22, 2019, 6 pgs.
Contemporary Amperex Technology Co. Limited Extended European Search Report, EP19156055.6, dated Jun. 12, 2019, 9 pgs.
Contemporary Amperex Technology Co., Limited, First Office action, CN201810696957.2, dated Jan. 8, 2019, 5 pgs.

* cited by examiner

Primary Examiner — Muhammad S Siddiquee
(74) Attorney, Agent, or Firm — Morgan, Lewis & Bockius LLP

(57) ABSTRACT

The present disclosure provides a positive electrode plate and a battery, the positive electrode plate comprises a positive current collector and a positive film, the positive film is provided on least one surface of the positive current collector and comprises a positive active material, the positive active material comprises a layered lithium-containing compound, and an OI value of the positive film represented by $C_{OI}$ is less than or equal to 150. The positive electrode plate of the present disclosure has smaller swelling and excellent dynamics performance, and the battery of the present disclosure has high safety performance, excellent dynamics performance and long cycle life at the same time.

19 Claims, No Drawings

POSITIVE ELECTRODE PLATE AND BATTERY

CROSS-REFERENCE TO RELATED APPLICATIONS

The present application claims priority to Chinese patent application No. CN201810696957.2, filed on Jun. 29, 2018, which is incorporated herein by reference in its entirety.

FIELD OF THE PRESENT DISCLOSURE

The present disclosure relates to the field of battery, and particularly relates to a positive electrode plate and a battery.

BACKGROUND OF THE PRESENT DISCLOSURE

Safety performance, service life and charging time are factors restricting rapid developments of new energy electric automotives compared with traditional oil-fueled automotives, and in order to realize that the electric automotives have high safety performance, long service life and fast charging capability, the power battery thereof must have high safety performance, long cycle life and fast charging capability. However, swelling easily occurs during cycle process of the battery, the electrolyte inside the battery cannot uniformly infiltrate the electrode plate, battery polarization increases, and lithium is easily precipitated on the surface of the negative electrode plate, which not only results in a safety hazard, but also continues to deteriorate the performances of the battery, for example, power performance of the battery continues to decrease and the cycle life of the battery decays rapidly.

In order to solve these problems, researchers have done a lot of research, but only a limited improvement effect is achieved, and the safety performance and the cycle life of the battery have not been fundamentally resolved.

SUMMARY OF THE PRESENT DISCLOSURE

In view of the problem existing in the background, an object of the present disclosure is to provide a positive electrode plate and a battery, the positive electrode plate has smaller swelling and excellent dynamics performance.

Another object of the present disclosure is to provide a positive electrode plate and a battery, the battery has high safety performance, excellent dynamics performance and long cycle life at the same time.

In order to achieve the above objects, in a first aspect of the present disclosure, the present disclosure provides a positive electrode plate, which comprises a positive current collector and a positive film, the positive film is provided on at least one surface of the positive current collector and comprises a positive active material, the positive active material comprises a layered lithium-containing compound, and an OI value of the positive film represented by $C_{OI}$ is less than or equal to 150.

In a second aspect of the present disclosure, the present disclosure provides a battery, which comprises the positive electrode plate according to the first aspect of the present disclosure.

Compared with the existing technologies, the present disclosure includes at least following beneficial effects: in the present disclosure, by reasonably controlling the OI value of the positive film, the lithium ions may be quickly deintercalated from the positive electrode plate, the positive electrode plate has excellent dynamics performance; the swelling of the positive electrode plate during the cycle process is smaller, thereby avoiding the unfavorable effects on the performance of the battery caused by the swelling of the positive electrode plate, and thus the battery can have high safety performance, excellent dynamics performance and long cycle life at the same time.

DETAILED DESCRIPTION

Hereinafter a positive electrode plate and a battery according to the present disclosure are described in detail.

Firstly, a positive electrode plate according to a first aspect of the present disclosure is described. The positive electrode plate comprises a positive current collector and a positive film, the positive film is provided on at least one surface of the positive current collector and comprises a positive active material, the positive active material comprises a layered lithium-containing compound, and an OI value of the positive film represented by $C_{OI}$ is less than or equal to 150.

The OI value of the positive film is defined as $C_{OI}=C_{003}/C_{110}$, where $C_{003}$ represents a characteristic diffraction peak area of (003) crystal plane in X-ray diffraction pattern of the positive electrode plate, $C_{110}$ represents a characteristic diffraction peak area of (110) crystal plane in X-ray diffraction pattern of the positive electrode plate.

Generally, there is a stronger c-axis orientation (that is (003) crystal plane orientation) in the layered lithium-containing compound, which will affect deintercalation and intercalation of the lithium ions, and in turn affect the dynamics performance of the positive electrode plate. In the layered lithium-containing compound, an angle between (003) crystal plane and (110) crystal plane is 90°, therefore $C_{003}/C_{110}$ may reflect the orientation degree of the layered lithium-containing compound. However, the positive electrode plate further comprises non-active materials such as conductive agent and binder besides the layered lithium-containing compound, and these non-active materials cannot deintercalate the lithium ions; moreover, during the preparation process of the positive electrode plate, cold pressing, baking and the like usually tend to change the orientation of the layered lithium-containing compound, therefore an OI value of a powder of the layered lithium-containing compound cannot reflect actual capability of deintercalation and intercalation of the lithium ions of the positive electrode plate.

The OI value of the positive film may reflect the orientation degree of the stacked layered lithium-containing compound particles in the positive film, and reflect the actual capability of deintercalation and intercalation of the lithium ions of the positive film. The inventors found that, the larger the OI value of the positive film is, the larger the probability that the layered plane of the layered lithium-containing compound particle in the positive film is parallel to the positive current collector is (that is the preferred orientation of (003) crystal plane is more prone to be parallel to the positive current collector), the slower the deintercalation speed and the intercalation speed of the lithium ions in the positive electrode plate is, and the worse the dynamics performance of the positive electrode plate is; otherwise, the smaller the OI value of the positive film is, the smaller the probability that the layered plane of the layered lithium-containing compound particles in the positive film is parallel to the positive current collector is (that is the preferred orientation of (003) crystal plane is more prone to be perpendicular to the positive current collector), the faster the deintercalation speed and the intercalation speed of the lithium ions in the positive electrode plate is, and the better the dynamics performance of the positive electrode plate is.

Moreover, the positive electrode plate will swell to various degrees during the charge-discharge cycle process of the battery, the swelling of the positive electrode plate is mainly derived from the swelling of the positive active material particles in the positive film, and the swelling direction of the positive active material particle mainly is perpendicular to the layered plane of the positive active material particle, that is, the thickness increase of the positive film is mainly derived from the swelling of the positive active material particles in the positive film which have the layered plane parallel to the positive current collector. Therefore, the larger the OI value of the positive film is, the larger the probability that the layered plane of the layered lithium-containing compound particle in the positive film is parallel to the positive current collector is, the higher the content of the layered lithium-containing compound particles in the positive film which have a layered plane parallel to positive current collector is, the larger the thickness increase of the positive electrode plate during the charge-discharge cycle process of the battery is, and vice versa.

When the swelling of the positive electrode plate is too large, the electrode assembly (that is main body of the battery) will transfer the swelling force from the inside of the electrode assembly to the outside of the electrode assembly, and the positive current collector has worse toughness than the negative current collector, the positive film is prone to fracture at a partial region of the positive current collector where the subjected swelling force is large, and the fractured positive film will puncture the separator and cause the risk of internal short circuit of the battery to rise, therefore the battery has a higher safety hazard. The swollen positive electrode plate will also directly squeeze the negative electrode plate and result in a poor electrolyte infiltration, when the battery is charged under a higher rate, the battery polarization increases, the lithium is precipitated at a partial region of the surface of the negative electrode plate, which not only increases the safety hazard of the battery, but also accelerates the capacity decay of the battery during the cycle process. The swelling of the positive electrode plate will also make the positive active material particles peel off from each other, the gap between the positive active material particles enlarges, the conductive network of the positive electrode plate is damaged, when the battery is charged under a higher rate, the battery polarization increases, and in turn the charge power and the discharge power of the battery decrease and the heat generated in the battery increases.

In the positive electrode plate according to the first aspect of the present disclosure, the OI value of the positive film is controlled to be within a certain range (less than or equal to 150), the positive active material particles are prone to be randomly distributed in the positive film, the lithium ions may be quickly deintercalated from and intercalated into the positive electrode plate, the residual stress inside the positive film is smaller, the swelling of the positive electrode plate during the cycle process is smaller, thereby avoiding the unfavorable effects on the performance of the battery caused by the swelling of the positive electrode plate, and thus the battery can have high safety performance, excellent dynamics performance and long cycle life at the same time. When the OI value of the positive film is more than 150, the orientations of the stacked particles inside the positive film will have very large isotropy degree, the lithium ions are difficult to deintercalate from and intercalate into the positive electrode plate, and the swelling of the positive electrode plate is very large during the charge-discharge cycle process of the battery, which will directly affect the performance of the battery.

From viewpoint of preparation process and cost, preferably, the OI value of the positive film represented by $C_{OI}$ is 2~150.

More preferably, the OI value of the positive film represented by $C_{OI}$ is 4~120.

More further preferably, the OI value of the positive film represented by $C_{OI}$ is 5~100.

In the positive electrode plate according to the first aspect of the present disclosure, the layered lithium-containing compound may be one or more selected from a group consisting of $LiCoO_2$, $LiNiO_2$, $LiMnO_2$, $LiNi_xCO_{1-x}O_2$ (0<x<1), $LiNi_xCo_yMn_{1-x-y}O_2$ (0<x<1, 0<y<1, 0<x+y<1), $LiNi_xCo_yAl_{1-x-y}O_2$ (0<x<1, 0<y<1, 0<x+y<1) and modified compounds of the aforementioned compounds. The modifying method may be doping modification, coating modification or doping and coating modification at the same time.

The doping element may be cation, anion or complex ions of anion and cation, the purpose of the doping modification is to dope some cations, anions or complex ions into the crystal lattice of these layered lithium-containing compounds, it is beneficial for reducing the first cycle irreversible capacity and making the integrity of the layered structure of the layered lithium-containing compound more complete, and making the stability of the crystal structure of the layered lithium-containing compound higher, therefore the probability of particle break and the probability of crystal structure damage are lower, which is beneficial for improving the cycle performance and the thermal stability of the battery. The specific method of the doping modification is not limited, for example, a wet doping may be used in the coprecipitation stage of the precursor, or a dry doping may be used in the sintering stage. Preferably, an element used in the cation doping may be one or more selected from a group consisting of Al, Zr, Ti, B, Mg, V, Cr, Zn and Y; an element used in the anion doping may be one or more selected from a group consisting of F, P and S, F is more preferable. F may not only promote the sintering of the layered lithium-containing compound so as to make the layered structure of the layered lithium-containing compound more stable, but also may stabilize the interface between the layered lithium-containing compound and the electrolyte during the cycle process, therefore it is beneficial for improving the cycle performance of the battery.

Preferably, a total doping amount of the cations and the anions is not more than 20%.

The coating layer functions to separate the electrolyte and the layered lithium-containing compound so as to reduce the side reactions between electrolyte and the layered lithium-containing compound to a very large extent, reduce the dissolution of the transition metals inside the layered lithium-containing compound, and improve the electrochemical stability of the layered lithium-containing compound. The coating layer may be a carbon layer, a graphene layer, an oxide layer, an inorganic salt layer or a conductive polymer layer. Preferably, the oxide may be an oxide formed from one or more selected from a group consisting of Al, Ti, Mn, Zr, Mg, Zn, Ba, Mo and B; the inorganic salt may be one or more selected from a group consisting of $Li_2ZrO_3$, $LiNbO_3$, $Li_4Ti_5O_{12}$, $Li_2TiO_3$, $Li_3VO_4$, $LiSnO_3$, $Li_2SiO_3$ and $LiAlO_2$; the conductive polymer may be polypyrrole (PPy), poly(3,4-ethylenedioxythiophene) (PEDOT) or polyamide (PI).

Preferably, the layered lithium-containing compound may be one or more specifically selected from a group consisting of $LiCoO_2$, $LiNiO_2$, $LiMnO_2$, $LiNi_{0.33}Co_{0.33}Mn_{0.33}O_2$, $LiNi_{0.5}Co_{0.2}Mn_{0.3}O_2$, $LiNi_{0.5}Co_{0.25}Mn_{0.25}O_2$, $LiNi_{0.6}Co_{0.2}Mn_{0.2}O_2$, $LiNi_{0.8}Co_{0.1}Mn_{0.1}O_2$, $LiNi_{0.85}Co_{0.1}Mn_{0.05}O_2$ and $LiNi_{0.8}Co_{0.15}Al_{0.05}O_2$.

The positive active material may further comprise one or more selected from a group consisting of spinel lithium manganese oxide ($LiMn_2O_4$), spinel lithium nickel manganese oxide ($LiNi_xMn_{2-x}O_4$, $0<x<2$) and polyanion-type positive active material besides the layered lithium-containing compound. The polyanion-type positive active material may be phosphate polyanion-type positive active material, silicate polyanion-type positive active material and sulfate polyanion-type positive active material. The phosphate polyanion-type positive active material typically may be $LiFePO_4$, $LiMnPO_4$, $LiVPO_4F$ and $Li_3V_2(PO_4)_3$, the silicate polyanion-type positive active material typically may be $Li_2FeSiO_4$, $Li_2MnSiO_4$, $Li_2CoSiO_4$ and $Li_2NiSiO_4$, the sulfate polyanion-type positive active material typically may be $Li_2Fe_2(SO_4)_3$ and $LiFeSO_4F$.

In the positive electrode plate according to the first aspect of the present disclosure, at least a part of the positive active material is single particle (it means non-agglomerated particle). Preferably, the layered lithium-containing compound comprises one or more selected from a group consisting of $LiNi_xCO_yMn_{1-x-y}O_2$ ($0<x<1$, $0<y<1$, $0<x+y<1$), $LiNi_x Co_yAl_{1-x-y}O_2$ ($0<x<1$, $0<y<1$, $0<x+y<1$) and modified compounds of the aforementioned compounds, and at least a part of $LiNi_xCO_yMn_{1-x-y}O_2$ ($0<x<1$, $0<y<1$, $0<x+y<1$), $LiNi_x Co_yAl_{1-x-y}O_2$ ($0<x<1$, $0<y<1$, $0<x+y<1$) and the modified compounds thereof is single particle. The positive active material which is single particle may improve the whole pressing density and the extensibility of the positive electrode plate, and also reduce the contact area between the positive active material and the electrolyte, reduce the occurrence of the side reactions at the interface between the positive active material and the electrolyte, reduce the amount of the gas to be generated in the battery, thereby further improving the cycle performance of the battery.

In the positive electrode plate according to the first aspect of the present disclosure, an areal density of the positive film will also affect the performances of the battery. The inventors further found that, the safety performance, the dynamics performance and the cycle life of the battery are further improved when the positive electrode plate further satisfies a relationship: $0.015 \leq C_{OI} \times \rho \leq 4$, where $\rho$ represents the areal density of the positive film with a unit of $g/cm^2$.

If an upper limit value of $C_{OI} \times \rho$ is more than 4, usually the OI value of the positive film and the areal density of the positive film are both larger or one of the OI value of the positive film and the areal density of the positive film is larger. When the OI value of the positive film is larger, the deintercalation speed and the intercalation speed of the lithium ions in the positive electrode plate is slower, the dynamics performance of the positive electrode plate is worse, and the swelling of the positive electrode plate is larger during the charge-discharge cycle process of the battery, the positive electrode plate will squeeze the negative electrode plate and affect the dynamics performance of the negative electrode plate, finally the lithium is prone to precipitate on the surface of the negative electrode plate. When the areal density of the positive film is larger, the infiltration of the electrolyte into the positive film is worse, the electrolyte cannot sufficiently infiltrate the positive active material, in turn the charge transfer impedance at the interface between the positive active material and electrolyte is higher, the dynamics performance of the battery is also affected, and it is not beneficial for further improving the charging capacity and the cycle life of the battery.

If a lower limit value of $C_{OI} \times \rho$ is less than 0.015, usually the areal density of the positive film is usually smaller, the OI value of the positive film is also easily smaller, although the swelling of the positive electrode plate during the charge-discharge cycle process of the battery is smaller and the positive electrode plate will not squeeze the negative electrode plate and affect the dynamics performance of the negative electrode plate, the positive active material particles are easily crushed during the cold pressing process of the positive film, the probability of crystal damage increases, and it is not beneficial for further improving the cycle performance of the battery.

Therefore, by further matching the relationship between the OI value of the positive film and the areal density of the positive film and keeping the product thereof within a reasonable range ($0.015 \leq C_{OI} \times \rho \leq 4$), the charging capacity and the cycle life of the battery can be further improved. In some embodiments of the present disclosure, the lower limit value of $C_{OI} \times \rho$ may be any one of 0.015, 0.02, 0.03, 0.04, 0.05, 0.06, 0.07, 0.08, 0.09, 0.10, 0.11, 0.12, 0.13, 0.14, 0.15, 0.16, 0.17, 0.18, 0.20, 0.25, 0.35, 0.40, 0.45, 0.50, 0.55, 0.60, 0.62 and 0.65, the upper limit value of $C_{OI} \times \rho$ may be any one of 0.20, 0.25, 0.30, 0.40, 0.50, 0.60, 0.70, 0.75, 0.80, 0.85, 0.90, 1.0, 1.1, 1.2, 1.3, 1.4, 1.5, 1.6, 1.7, 1.8, 2.0, 2.2, 2.5, 2.7, 3.0, 3.5 and 4.0.

Preferably, the positive electrode plate further satisfies a relationship: $0.03 \leq C_{OI} \times \rho \leq 3$.

More preferably, the positive electrode plate further satisfies a relationship: $0.05 \leq C_{OI} \times \rho \leq 2$.

In the positive electrode plate according to the first aspect of the present disclosure, the smaller the areal density of the positive film $\rho$ is, the faster the deintercalation speed and the intercalation speed of the lithium ions in the positive electrode plate is, the faster the transferring speed of the lithium ions between the positive electrode plate and the negative electrode plate is, and in turn it is beneficial for improving the charge-discharge speed of the battery and improving the dynamics performance and the cycle performance of the battery. However, the smaller the areal density of the positive film is, the lower the capacity per gram of the positive electrode plate is, and the positive active material particles are easily crushed during the processing of the positive electrode plate, which is not beneficial for improving the cycle performance of the battery; also there is less amount of capacity remained after multiple charge-discharge cycles, and the service life of the battery is also affected. Therefore, the performances of the battery can be further improved by further reasonably controlling the areal density of the positive film $\rho$. Preferably, the areal density of the positive film $\rho$ is $0.006$ $g/cm^2 \sim 0.03$ $g/cm^2$; more preferably, the areal density of the positive film $\rho$ is $0.008$ $g/cm^2 \sim 0.25$ $g/cm^2$; more further preferably, the areal density of the positive film $\rho$ is $0.01$ $g/cm^2 \sim 0.02$ $g/cm^2$.

In the positive electrode plate according to the first aspect of the present disclosure, the positive film further comprises a conductive agent and a binder, the types and the contents of the conductive agent and the binder are not specifically limited and may be selected based on actual demands.

In the positive electrode plate according to the first aspect of the present disclosure, the type of the positive current collector is also not specifically limited and may be selected based on actual demands, and preferably, the positive current collector is an aluminum foil.

In the positive electrode plate according to the first aspect of the present disclosure, a preparation process of the positive electrode plate may comprise steps of: (1) mixing: a positive active material, a conductive agent and a binder with a certain ratio are uniformly dissolved in a solvent to obtain a slurry; (2) coating: the slurry is uniformly coated on the positive current collector, which is then sufficiently dried to remove the solvent via an oven; (3) cold pressing: the dried positive electrode plate is then cold pressed under a certain pressure and a certain roll gap; (4) cutting: the cold pressed positive electrode plate is plate cut to a specified size for use.

In the above preparation process of the positive electrode plate, an average particle size D50 of the positive active material and an OI value of a powder of the positive active material represented by $G_{OI}$ both will affect the OI value of the positive film represented by $C_{OI}$ to an extent, therefore the desired $C_{OI}$ may be obtained by changing values of D50 and $G_{OI}$; the value of $C_{OI}$ may also be changed by using magnetic field inducing technique during the coating process of the slurry so as to artificially induce the arrangement of the positive active materials in the positive electrode plate; the value of $C_{OI}$ may also be changed by changing the cold pressing parameters (such as cold pressing pressure and the like) during the cold pressing process and adjusting the pressing density of the positive film so as to change the arrangement of the positive active materials in the positive electrode plate.

Preferably, the average particle size D50 of the positive active material is 1 μm~20 μm; more preferably, the average particle size D50 of the positive active material is 2 μm~15 μm; more further preferably, the average particle size D50 of the positive active material is 4 μm~12 μm. When the average particle size of the positive active material is too small, the specific surface area of the positive active material usually is larger, the oxidation activity becomes higher, the side reactions on the surface of the positive active material will increase, the gas production problem caused by the decomposition of the electrolyte is serious. When the average particle size of the positive active material is too large, the diffusion path of the lithium ion in the positive active material with a large particle size is longer, and the resistance to be overcome by diffusion is larger, the crystal plane deformation and the volume swelling of the positive active material during the intercalation process are continually accumulated, and the intercalation process gradually becomes difficult. When the particle size of the positive active material falls within the above preferred range thereof, the positive electrode plate has better homogeneity, which may prevent the positive active material with too small particle size from affecting the performances of the battery by generating more side reactions with the electrolyte, and also prevent the positive active material with too large particle size from affecting the performances of the battery by hindering the transmission of the lithium ions inside the positive active material particles.

Preferably, the OI value of the powder of the positive active material represented by $G_{OI}$ is 1~15; more preferably, the OI value of the powder of the positive active material represented by $G_{OI}$ is 3~10. When the OI value of the powder of the positive active material falls within the above preferred range thereof, the positive active material may have better isotropy, and it is more beneficial for the deintercalation and the intercalation of the lithium ions.

Preferably, the pressing density of the positive film PD is controlled to be 3.0 g/cm³~4.0 g/cm³; more preferably, the pressing density of the positive film PD is controlled to be 3.1 g/cm³~3.6 g/cm³. When the pressing density falls within the above preferred range thereof, the integrity of the positive active material particle is higher, and the electrical contact between the positive active material particles is better.

In the positive electrode plate according to the first aspect of the present disclosure, the parameters of the positive active material and the positive electrode plate can be measured as follows, or can be measured according to other methods known in the art, and the obtained results are both within the error range.

The OI value of the powder of the positive active material represented by $G_{OI}$ and the OI value of the positive film represented by $C_{OI}$ may be obtained by a X-ray powder diffractometer (X'pert PRO), a X-ray diffraction pattern is obtained according to the general rules for X-ray diffractometric analysis JIS K 0131-1996, the OI value=$C_{003}/C_{110}$, $C_{003}$ represents characteristic diffraction peak area of (003) crystal plane, $C_{110}$ represents characteristic diffraction peak area of (110) crystal plane. Specifically, the test method of the OI value of the powder of the positive active material comprises steps of: directly placing a certain amount of the powder of the positive active material in an X-ray powder diffractometer, and obtaining characteristic diffraction peak area of (003) crystal plane and characteristic diffraction peak area of (110) crystal plane by X-ray diffractometric analysis, in turn obtaining the OI value of the powder of the positive active material. Specifically, the test method of the OI value of the positive film comprises steps of: directly placing the prepared positive electrode plate in an X-ray powder diffractometer, and obtaining characteristic diffraction peak area of (003) crystal plane and characteristic diffraction peak area of (110) crystal plane by X-ray diffractometric analysis, in turn obtaining the OI value of the positive film.

The pressing density of the positive film is defined as PD=the areal density of the positive film ρ/the thickness of the positive film, where the thickness of the positive film can be measured by a spiral micrometer with an accuracy of 0.5 μm.

The particle size D50 of the positive active material may be measured by a laser diffraction particle size analyzer (Mastersizer 3000), the particle size distribution is obtained with the particle size analysis-laser diffraction method (specifically referring to GB/T19077-2016), and the average particle size is represented by the median value D50 of the volume particle size distribution.

Next a battery according to a second aspect of the present disclosure is described, the battery comprises a positive electrode plate, a negative electrode plate, an electrolyte and a separator, the positive electrode plate is the positive electrode plate according to the first aspect of the present disclosure.

In the battery according to the second aspect of the present disclosure, the negative electrode plate comprises a negative current collector and a negative film, the negative film is provided on at least one surface of the negative current collector and comprises a negative active material, a conductive agent and a binder. The types and the contents of the negative active material, the conductive agent and the binder are not specifically limited and may be selected based on actual demands. Preferably, the negative active material is one or more selected from a group consisting of artificial graphite, natural graphite, soft carbon, hard carbon, mesocarbon microbeads, silicon-based material, tin-based material and lithium titanate. The silicon-based material may be one or more selected from a group consisting of elemental silicon, silicon oxide, silicon carbon composite and silicon alloy, the tin-based material is one or more selected from a group consisting of elemental tin, tin oxide compound and tin alloy. The type of the negative current collector is also not specifically limited and may be selected based on actual demands, and preferably, the negative current collector is a copper foil.

In the battery according to the second aspect of the present disclosure, the electrolyte comprises a lithium salt and an organic solvent, the types and the specific components of the lithium salt and the organic solvent are not specifically limited and may be selected based on actual demands. Preferably, the lithium salt may be one or more selected from a group consisting of lithium hexafluorophosphate, lithium tetrafluoroborate and lithium perchlorate, the organic solvent may comprise one or more selected from a group consisting of cyclic carbonate, chain carbonate and carboxylate. The electrolyte may also comprise functional additives, such as vinylene carbonate, ethylene sulfate, propane sultone, fluoroethylene carbonate and the like In the battery according to the second aspect of the present disclosure, the type of the separator is not specifically limited and may be selected based on actual demands, the separator may be any separator used in existing batteries, for example, the separator may be a polyethylene membrane, a polypropylene membrane, a polyvinylidene fluoride membrane and a multilayer composite membrane thereof, but the present disclosure is not limited thereto.

Hereinafter the present disclosure will be described in detail in combination with examples. It should be noted that, the examples described in the present disclosure are only used for explaining the present disclosure, and are not intended to limit the present disclosure.

Batteries of examples 1-34 and comparative examples 1-3 were all prepared in accordance with the following preparation method.

(1) Preparation of a Positive Electrode Plate

The positive active material shown in Table 1, acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on both surfaces of aluminum foil (positive current collector), drying was then performed under room temperature and continual drying was performed via a 120° C. oven, which was then followed by cold pressing and plate cutting, finally the positive electrode plate was obtained. During the preparation of the positive electrode plate, after a suitable positive active material was selected, the positive films with different OI values could be obtained by appropriately adjusting the cold pressing parameters or additionally using the magnetic field inducing technique.

(2) Preparation of a Negative Electrode Plate

Graphite (negative active material), Super-P (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on both surfaces of copper foil (negative current collector), drying was then performed under room temperature and continual drying was performed via a 120° C. oven, which was then followed by cold pressing and plate cutting, finally the negative electrode plate was obtained.

(3) Preparation of an Electrolyte

Ethylene carbonate (EC) and ethyl methyl carbonate (EMC) according to a volume ratio of 3:7 were mixed together to obtain an organic solvent, then sufficiently dried $LiPF_6$ was dissolved into the mixed organic solvent to obtain an electrolyte, and a concentration of the electrolyte was 1 mol/L.

(4) Preparation of a Separator

The separator was a polyethylene membrane.

(5) Preparation of a Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a battery was obtained.

Hereinafter test processes of the batteries were described.

(1) Testing of the Dynamics Performance

At 25° C., the batteries prepared in the examples and the comparative examples were first fully charged at a constant current of ×C, and then fully discharged at a constant current of 1 C for 10 cycles, then the batteries were fully charged at a constant current of ×C, then the negative electrode plates were disassembled, and the lithium precipitation on the surface of the negative electrode plate was observed. If the lithium precipitation was not observed on the surface of the negative electrode plate, the testing process was repeated with a charge rate ×C increased in increments of 0.1 C, until the lithium precipitation was observed on the surface of the negative electrode plate, and the testing was stopped, the charge rate ×C at this time minus 0.1C was the maximum charge rate of the battery.

(2) Testing of the Cycle Performance

At 25° C., the batteries prepared in the examples and the comparative examples were charged under the maximum charge rate and discharged at a constant current of 1 C, the full charge-full discharge cycle was repeated until the capacity of the battery was decayed to 80% of the initial capacity, and the cycle number of the battery was recorded.

TABLE 1

Parameters and test results of examples 1-34 and comparative examples 1-3

| | Positive active material | | Positive film | | | | Battery | |
|---|---|---|---|---|---|---|---|---|
| | Type | OI value of powder | D50 (μm) | Pressing density PD (g/cm³) | Areal density ρ (g/cm²) | $C_{OI}$ | $C_{OI} \times \rho$ | Cycle number | Charging capability |
| Example 1 | NCM | 15 | 20 | 3.3 | 0.014 | 150 | 2.10 | 2910 | 2.0 C |
| Example 2 | NCM | 14 | 15 | 3.3 | 0.014 | 120 | 1.68 | 3460 | 2.4 C |
| Example 3 | NCM | 13 | 12 | 3.3 | 0.014 | 100 | 1.40 | 3980 | 2.6 C |

TABLE 1-continued

Parameters and test results of examples 1-34 and comparative examples 1-3

| | Positive active material | | | Positive film | | | | Battery | |
|---|---|---|---|---|---|---|---|---|---|
| | | OI value of powder | D50 (μm) | Pressing density PD (g/cm$^3$) | Areal density ρ (g/cm$^2$) | $C_{OI}$ | $C_{OI} \times \rho$ | Cycle number | Charging capability |
| | Type | | | | | | | | |
| Example 4 | NCM | 12 | 10 | 3.3 | 0.014 | 70 | 0.98 | 4090 | 2.8 C |
| Example 5 | NCM | 11 | 9 | 3.3 | 0.014 | 50 | 0.70 | 3910 | 3.0 C |
| Example 6 | NCM | 10 | 8 | 3.3 | 0.014 | 35 | 0.49 | 3890 | 3.2 C |
| Example 7 | NCM | 10 | 7 | 3.3 | 0.014 | 15 | 0.21 | 4030 | 3.4 C |
| Example 8 | NCM | 6 | 5 | 3.3 | 0.014 | 8 | 0.11 | 4110 | 3.6 C |
| Example 9 | NCM | 4 | 4 | 3.3 | 0.014 | 5 | 0.070 | 3970 | 3.8 C |
| Example 10 | NCM | 3 | 2 | 3.3 | 0.014 | 4 | 0.056 | 3880 | 3.9 C |
| Example 11 | NCM | 1 | 1 | 3.3 | 0.014 | 2 | 0.028 | 4010 | 4.0 C |
| Example 12 | NCM | 4 | 5 | 3.0 | 0.014 | 6 | 0.084 | 4040 | 4.0 C |
| Example 13 | NCM | 4 | 5 | 3.1 | 0.014 | 8 | 0.11 | 3950 | 3.9 C |
| Example 14 | NCM | 4 | 5 | 3.2 | 0.014 | 10 | 0.14 | 3960 | 3.7 C |
| Example 15 | NCM | 4 | 5 | 3.3 | 0.014 | 12 | 0.17 | 3990 | 3.5 C |
| Example 16 | NCM | 4 | 5 | 3.4 | 0.014 | 14 | 0.20 | 3970 | 3.4 C |
| Example 17 | NCM | 4 | 5 | 3.3 | 0.001 | 50 | 0.05 | 2860 | 5.0 C |
| Example 18 | NCM | 4 | 5 | 3.3 | 0.006 | 50 | 0.30 | 3440 | 5.0 C |
| Example 19 | NCM | 4 | 5 | 3.3 | 0.008 | 50 | 0.40 | 4080 | 4.7 C |
| Example 20 | NCM | 4 | 5 | 3.3 | 0.025 | 50 | 1.25 | 3990 | 4.4 C |
| Example 21 | NCM | 4 | 5 | 3.3 | 0.030 | 50 | 1.50 | 3510 | 4.1 C |
| Example 22 | NCM | 4 | 5 | 3.3 | 0.040 | 50 | 2.00 | 1980 | 3.8 C |
| Example 23 | NCM | 14 | 5 | 3.3 | 0.030 | 150 | 4.50 | 1840 | 2.0 C |
| Example 24 | NCM | 12 | 5 | 3.3 | 0.029 | 140 | 4.06 | 3120 | 2.4 C |
| Example 25 | NCM | 12 | 5 | 3.3 | 0.025 | 120 | 3.00 | 3620 | 2.7 C |
| Example 26 | NCM | 10 | 5 | 3.3 | 0.040 | 50 | 2.00 | 4120 | 4.0 C |
| Example 27 | NCM | 8 | 5 | 3.3 | 0.005 | 10 | 0.05 | 4030 | 3.0 C |
| Example 28 | NCM | 4 | 5 | 3.3 | 0.006 | 5 | 0.03 | 4350 | 4.5 C |
| Example 29 | NCM | 1 | 5 | 3.3 | 0.008 | 2 | 0.016 | 3100 | 5.0 C |
| Example 30 | NCM | 0.4 | 5 | 3.3 | 0.006 | 2 | 0.012 | 1880 | 5.0 C |
| Example 31 | NCA | 8 | 5 | 3.3 | 0.014 | 10 | 0.14 | 4120 | 3.0 C |
| Example 32 | LCO | 8 | 5 | 3.3 | 0.014 | 12 | 0.17 | 3990 | 2.8 C |
| Example 33 | NCM + LMO | 8 | 5 | 3.3 | 0.014 | 9 | 0.13 | 4070 | 2.9 C |
| Example 34 | NCM + LFP | 8 | 5 | 3.3 | 0.014 | 14 | 0.20 | 4460 | 3.0 C |
| Comparative example 1 | NCM | 14 | 15 | 3.3 | 0.014 | 160 | 2.24 | 990 | 2.0 C |
| Comparative example 2 | NCA | 13 | 15 | 3.3 | 0.014 | 160 | 2.24 | 1040 | 1.8 C |
| Comparative example 3 | LCO | 12 | 15 | 3.3 | 0.014 | 160 | 2.24 | 780 | 1.7 C |

In Table 1, NCM specifically represented $LiNi_{0.8}Co_{0.1}Mn_{0.1}O_2$, NCA specifically represented $LiNi_{0.85}Co_{0.1}Mn_{0.05}O_2$, LMO specifically represented $LiMn_2O_4$, LFP specifically represented $LiFePO_4$ and LCO specifically represented $LiCoO_2$.

In the examples of the present disclosure, the prepared positive film all had a smaller OI value, the lithium ions could be quickly deintercalated from and intercalated into the positive electrode plate, the positive electrode plate had excellent dynamics performance, the swelling of the positive electrode plate during the cycle process was smaller, thereby avoiding the negative effects on the performances of the battery caused by the swelling of the positive electrode plate, finally the battery could have high safety performance, excellent dynamics performance and long cycle life at the same time and also could meet the requirements of the new energy electric automotives.

In comparative examples 1-3, although the OI value of the powder of the positive active material was moderate, however, the OI value of the finally prepared positive film was too large, the isotropy degree of the orientations of the stacked positive active material particles inside the positive film was larger, the lithium ions were difficult to deintercalate from and intercalate into the positive electrode plate, there was also a large residual stress inside the positive film, the swelling of the positive electrode plate was large during the cycle process of the battery, the positive electrode plate was easily fractured during the using process, and the internal short circuit of the battery was easily occurred, therefore the battery had a higher safety hazard. The swollen positive electrode plate would also directly squeeze the negative electrode plate and resulted in a poor electrolyte infiltration with the negative electrode plate, when the battery was charged under a higher rate, the battery polarization increased, the lithium was precipitated at a partial region of the surface of the negative electrode plate, therefore it could not meet the requirements on fast charging capability of the battery and could not meet the requirements on long cycle life of the battery.

When the areal density of the positive film p was further reasonably controlled and $C_{OI} \times \rho$ was between 0.015 and 4, the charging capability and the cycle life of the battery could be further improved. In example 23, the OI value of the positive film and the areal density of the positive film were both larger, the upper limit value of $C_{OI} \times \rho$ was more than 4, the residual stress in the positive film was larger and the positive film was thicker, therefore the dynamics performance of the battery was affected and it was not beneficial for further improving the charging capability of the battery. In example 30, the OI value of the positive film and the areal density of the positive film were both smaller, the lower limit value of $C_{OI} \times \rho$ was less than 0.015, the residual stress in the positive film was smaller, and the battery could have excellent dynamics performance, however, the capacity per gram of the positive electrode plate was lower, the energy density of the battery was lower, and the positive active material particles would be subjected to a larger pressure during the processing of the positive electrode plate and were easily crushed, therefore it was not beneficial for further improving the cycle performance of the battery. Preferably, the positive electrode plate further satisfied a relationship: $0.015 \leq C_{OI} \times \rho \leq 4$.

According to the foregoing disclosure and teaching of the present disclosure, a person skilled in the art may also make appropriate variations and modifications to the above implementing manners. Therefore, the present disclosure is not limited to the specific implementing manners disclosed and described in the above, modifications and variations of the present disclosure will also be fallen within the scope of the appended claims of the present disclosure. Furthermore, although specific terminologies are used in the present disclosure, these terminologies are merely for convenience of description, and are not intended to limit the present disclosure.

What is claimed:

1. A battery comprising a positive electrode plate, the positive electrode plate comprising a positive current collector and a positive film, the positive film being provided on least one surface of the positive current collector and comprising a positive active material,
   wherein the positive active material comprises a layered lithium-containing compound, and an OI value of the positive film represented by $C_{OI}$ is 5~100;
   wherein $C_{OI} = C_{003}/C_{110}$, where $C_{003}$ represents characteristic diffraction peak area of (003) crystal plane in X-ray diffraction pattern of the positive film, and $C_{110}$ represents characteristic diffraction peak area of (110) crystal plane in X-ray diffraction pattern of the positive film.

2. The battery according to claim 1, wherein the positive electrode plate further satisfies a relationship: $0.05 < C_{OI} \times \rho \leq 2$, where p represents an areal density of the positive film with a unit of g/cm$^2$.

3. The battery according to claim 1, wherein the layered lithium-containing compound is one or more selected from a group consisting of $LiNi_xCo_yMn_{1-x-y}O_2$, $LiNi_xCo_y$ $Al_{1-x-y}O_2$ and modified compounds of the aforementioned compounds, $0<x<1$, $0<y<1$, $0<x+y<1$.

4. The battery according to claim 1, wherein the OI value of the positive film represented by $C_{OI}$ is 10~70.

5. The battery according to claim 4, wherein the OI value of the positive film represented by $C_{OI}$ is 15~70.

6. The battery according to claim 5, wherein the OI value of the positive film represented by $C_{OI}$ is 35~70.

7. The battery according to claim 2, wherein the positive electrode plate satisfies a relationship: $0.20 \leq C_{OI} \times \rho \leq 1.50$.

8. The battery according to claim 7, wherein the positive electrode plate satisfies a relationship: $0.40 \leq C_{OI} \times \rho \leq 0.98$.

9. The battery according to claim 2, wherein the areal density of the positive film represented by p is 0.014 g/cm$^2$~0.03 g/cm$^2$.

10. The battery according to claim 9, wherein the areal density of the positive film represented by p is 0.014 g/cm$^2$~0.02 g/cm$^2$.

11. The battery according to claim 1, wherein an average particle size D50 of the positive active material is 1 μm~12 μm.

12. The battery according to claim 11, wherein the average particle size D50 of the positive active material is 4 μm~8 μm.

13. The battery according to claim 1, wherein an OI value of a powder of the positive active material represented by $G_{OI}$ is 1~15.

14. The battery according to claim 13, wherein the OI value of a powder of the positive active material represented by $G_{OI}$ is 3~10.

15. The battery according to claim 1, wherein a pressing density of the positive film represented by PD is 3.1 g/cm$^3$~3.6 g/cm$^3$.

16. The battery according to claim 15, wherein the pressing density of the positive film represented by PD is 3.3 g/cm$^3$~3.6 g/cm$^3$.

17. The battery according to claim 1, wherein at least a part of the positive active material is monocrystal particles.

18. The battery according to claim 1, wherein the positive active material further comprises one or more selected from a group consisting of spinel lithium manganese oxide, spinel lithium nickel manganese oxide and polyanion-type positive active material.

19. The battery according to claim 1, wherein the battery further comprises a negative electrode plate, an electrolyte and a separator.

* * * * *